US011808148B2

(12) United States Patent
Rafiee et al.

(10) Patent No.: US 11,808,148 B2
(45) Date of Patent: Nov. 7, 2023

(54) SYSTEMS AND METHODS FOR BACK-ALLOCATION OF OIL PRODUCED BY WATERFLOODING

(71) Applicant: Tachyus Corporation, Houston, TX (US)

(72) Inventors: Javad Rafiee, Houston, TX (US); Pallav Sarma, Houston, TX (US)

(73) Assignee: Tachyus Corporation, Houston, TX (US)

( * ) Notice: Subject to any disclaimer, the term of this patent is extended or adjusted under 35 U.S.C. 154(b) by 275 days.

(21) Appl. No.: 17/138,582

(22) Filed: Dec. 30, 2020

(65) Prior Publication Data
US 2022/0205359 A1   Jun. 30, 2022

(51) Int. Cl.
| | |
|---|---|
| E21B 49/08 | (2006.01) |
| G06Q 50/02 | (2012.01) |
| G01V 99/00 | (2009.01) |
| G06N 20/20 | (2019.01) |

(52) U.S. Cl.
CPC .......... *E21B 49/087* (2013.01); *G01V 99/005* (2013.01); *G06N 20/20* (2019.01); *G06Q 50/02* (2013.01); *E21B 2200/20* (2020.05)

(58) Field of Classification Search
CPC . E21B 49/087; E21B 2200/20; G01V 99/005; G06N 20/20; G06Q 50/02
See application file for complete search history.

(56) References Cited

U.S. PATENT DOCUMENTS

| | | | |
|---|---|---|---|
| 7,980,312 B1 * | 7/2011 | Hill ....................... | E21B 43/241 166/272.2 |
| 9,835,024 B2 * | 12/2017 | Ramirez Sabag ...... | E21B 47/11 |
| 2011/0320047 A1 * | 12/2011 | Stone ...................... | E21B 43/00 703/2 |
| 2012/0215511 A1 * | 8/2012 | Sarma .................... | G01V 1/308 703/10 |
| 2022/0129609 A1 * | 4/2022 | Dogru .................... | E21B 43/20 |

FOREIGN PATENT DOCUMENTS

| | | | | |
|---|---|---|---|---|
| CA | 3079352 A1 * | 4/2019 | ............. | E21B 43/16 |
| WO | WO-2019178432 A1 * | 9/2019 | ............. | E21B 43/16 |

OTHER PUBLICATIONS

F. Doster et al., "Generalized Buckley-Leverett theory for two-phase flow in porous media", 2011, New Journal of Physics, 13, 123030, pp. 1-33 (Year: 2011).*

* cited by examiner

*Primary Examiner* — Mischita L Henson
(74) *Attorney, Agent, or Firm* — Vinson & Elkins L.L.P.

(57) ABSTRACT

Systems, methods, and computer-readable media for determining the production rate of oil produced from each of a plurality of oil-bearing geological layers in an oil field. In some embodiments, the method comprises allocating injected fluid into each layer of a plurality of oil-bearing geological layers to a plurality of paths from injection sites of injection wells to production wells in each layer by balancing the mass of fluid injected into and the total fluid recovered from each oil-bearing geological layer. In some embodiments, the method comprises calculating estimated geological properties for each path in the plurality of paths to match total oil and injection fluid recovered at each production well in the plurality of production wells. In some embodiments, the method comprises using the estimated geological properties, calculating an oil production rate for each path between an injector well and a production well in a geological layer.

21 Claims, 10 Drawing Sheets

SYSTEMS AND METHODS FOR BACK-ALLOCATION OF OIL PRODUCED BY WATERFLOODING

TECHNICAL FIELD

Aspects of the present disclosure relate to computer-implemented methods, systems, and computer-readable storage media for determining the production rate of oil produced from each of a plurality wells in an oil field with a plurality of oil-bearing geological layers, and for determining the allocated injection rates to these wells from connected injector wells.

BACKGROUND

In the oil industry, waterflooding or water injection is where water is injected into the oil field to increase pressure in specific oil reservoirs and thereby stimulate production. Water injection wells can be found both on- and offshore, to increase oil recovery from an existing reservoir. Water is injected to support pressure of the reservoir (also known as voidage replacement), and also to sweep or displace oil from the reservoir and push it towards a production well.

In many circumstances, an oil field can have a plurality of oil-producing wells and water-injection wells, each of which are perforated in a plurality of oil reservoirs or layers. The water injection rates are frequently measured at layer level, but production rates of oil and water are usually only measured at wellhead, as running production logging tools are expensive and require disruption of production. However, for various reservoir management and engineering tasks, there is a need to dynamically allocate the injection rates to producers, and to determine water and oil production rates at different reservoir layers. This need to allocate production to various layers may require to be performed in view of regulatory mandates, contractual obligations, reserves estimation, economic forecasting and evaluation, waterflood performance, water shutoff/re-entry, field recovery optimization, and/or to plan infill drilling.

This process can be very time consuming and inaccurate if done manually, which is currently the norm in the industry. Current approaches to production allocation usually use a permeability-thickness (KH) model, which is quite simplistic and can lead to erroneous results. Injection allocation is done using either simple geometric patterns or complex streamline simulators which are difficult to fit to historical data and time consuming to build. Since injection rates, production rates, and connectivity are dynamically changing, there is a need to do this on a continuous basis, which is impractical with current approaches. Current approaches are also deterministic in nature and do not account for uncertainty.

What is needed, therefore, is a method for determining back-allocations of oil produced at production wells to oil-bearing geological layers. What is also needed is a method for determining such back-allocations as a function of time. Systems and methods are described herein for accomplishing this and other purposes.

The disclosed technology here relates to a novel way to find the injection allocation dynamically changing with time which satisfy total mass balance equation for both injectors and producers. Given the dynamic allocations, aspects of the disclosed technology solve the Buckley-Leverett model by tuning its parameters using an ensemble-based method to match the oil and water rates at well level.

SUMMARY

Aspects of the present disclosure include a computer-implemented method for determining the production rate of oil produced from each of a plurality of oil-bearing geological layers in an oil field, the method comprising allocating injected fluid into each layer of a plurality of oil-bearing geological layers to a plurality of paths from injection sites of injection wells to production wells in each layer by balancing the mass of fluid injected into and the total fluid recovered from each oil-bearing geological layer, calculating estimated geological properties for each path in the plurality of paths to match total oil and injection fluid recovered at each production well in the plurality of production wells, and using the estimated geological properties, calculating an oil production rate for each path between an injector well and a production well in a geological layer.

In some embodiments, the step of allocating injection fluid is performed by: determining an optimal set of allocations of injected fluid to the plurality of paths that balance the injected fluid into each layer, the total fluid produced at the plurality of production wells, and a plurality of slack variables where the optimal set of allocations is constrained such that the connection allocation rates over time are smooth, and that the slack variables are minimized. In some embodiments, the step of calculating estimated geological properties comprises estimating parameters of the Buckley-Leverett model for two-phase flow in porous media. In some embodiments, the set of estimated geological properties comprises pore volume, relative permeability curves, and curves for a primary cut of injected fluid. In some embodiments, the step of calculating the set of estimated geological properties comprises using an ensemble of models and the allocations of injected fluid into each path connected to each production well which fit the total oil and water produced at that production well. In some embodiments, each model produces an individual estimate of the geological properties, and wherein the estimated geological properties are calculated by characterizing a distribution formed from the individual estimates of the ensemble of models. In some embodiments, the plurality of paths from injection sites of injection wells to production wells in each layer is calculated from a map of injection well sites and production well sites based on the distances between the injection well sites and production well sites.

Embodiments of the disclosed technology can further include computing systems configured to implement the methods disclosed herein, and non-transitory computer-readable storage media containing instructions that, when executed, perform such methods. Further, embodiments of the present disclosed technology can comprise combinations of the features described above, as well as the various features described in the description, figures, and claims.

BRIEF DESCRIPTION OF THE DRAWINGS

Included in the present specification are figures which illustrate various embodiments of the present disclosed technology. As will be recognized by a person of ordinary skill in the art, actual embodiments of the disclosed technology need not incorporate each and every component illustrated, but may omit components, add additional components, or change the general order and placement of components. Reference will now be made to the accompanying figures and flow diagrams, which are not necessarily drawn to scale, and wherein.

DETAILED DESCRIPTION

Figure 1:
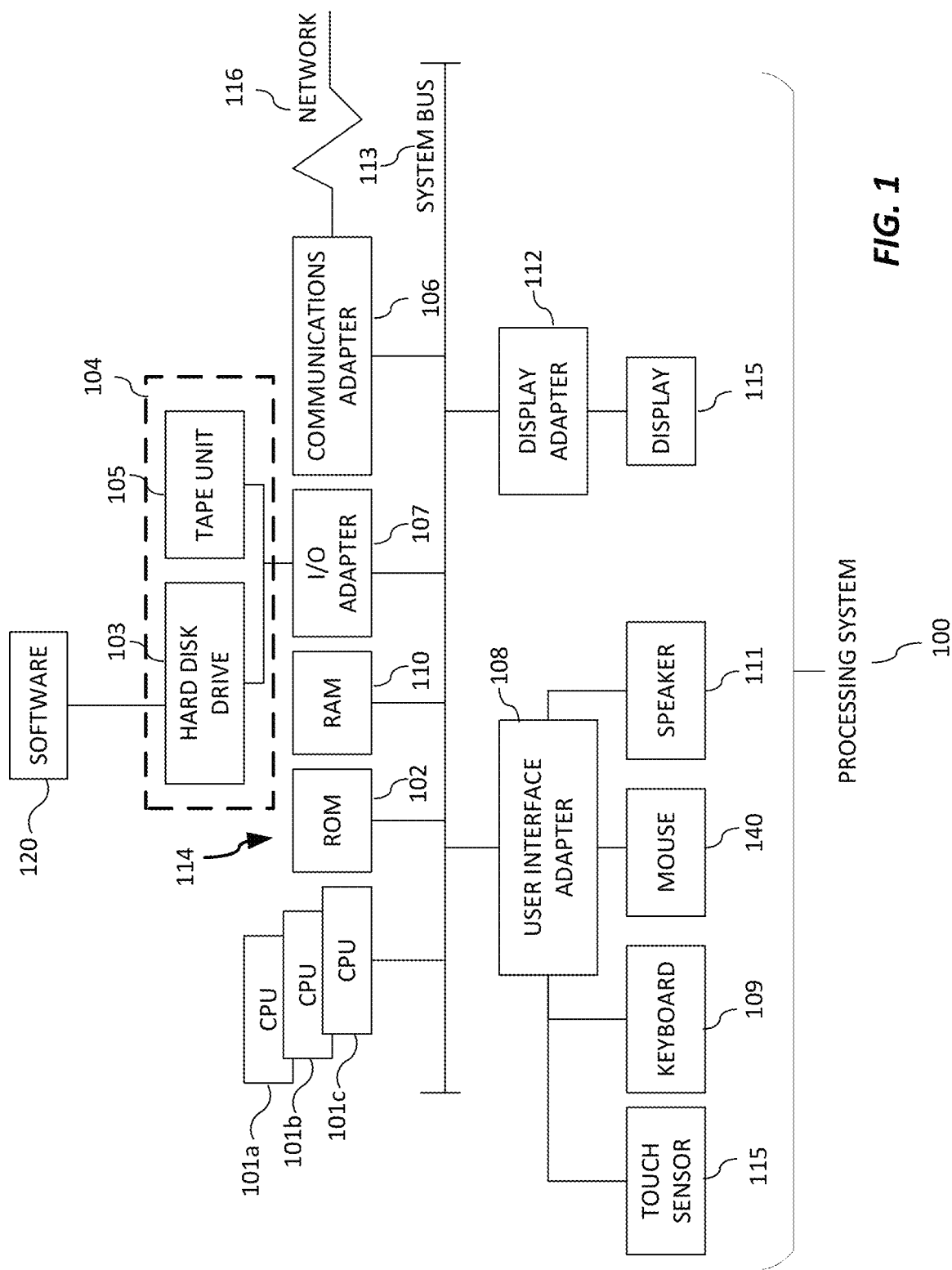
FIG. 1 depicts a computing device in accordance with embodiments.

The present disclosed technology can combine machine learning and physical models to implement a novel back-allocation tool that can be fully automated and unbiased, and can run continuously in real time to provide dynamic injection and production allocation at layer level. In some embodiments, this can be performed by relying on injection data, well level production data, and predefined connections between injectors and producers.

Although example embodiments of the present disclosure are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

In the following detailed description, references are made to the accompanying drawings that form a part hereof and that show, by way of illustration, specific embodiments or examples. In referring to the drawings, like numerals represent like elements throughout the several figures.

Various products and services provided by third parties are mentioned as example components of embodiments in accordance with the disclosed technologies. The use of trademarked (registered or common-law) names are intended for descriptive purposes only—no claim of ownership over the terms is asserted by the applicants. Further, the mention of a trademarked product or service is as an example only. Other products and services providing equivalent functions, whether commercial, open-source, or custom-developed to support embodiments are contemplated in accordance with the disclosed technology.

Referring now to FIG. 1, there is shown embodiments of a processing system 100 for implementing the teachings herein. In this embodiment, the processing system 100 has one or more central processing units (processors) 101a, 101b, 101c, etc. (collectively or generically referred to as processor(s) 101). Processors 101, also referred to as processing circuits, are coupled to system memory 114 and various other components via a system bus 113. Read only memory (ROM) 102 is coupled to system bus 113 and may include a basic input/output system (BIOS), which controls certain basic functions of the processing system 100. The system memory 114 can include ROM 102 and random access memory (RAM) 110, which is read-write memory coupled to system bus 113 for use by processors 101.

FIG. 1 further depicts an input/output (I/O) adapter 107 and a network adapter 106 coupled to the system bus 113. I/O adapter 107 may be a small computer system interface (SCSI) adapter that communicates with a hard disk (magnetic, solid state, or other kind of hard disk) 103 and/or tape storage drive 105 or any other similar component. I/O adapter 107, hard disk 103, and tape storage drive 105 are collectively referred to herein as mass storage 104. Software 120 for execution on processing system 100 may be stored in mass storage 104. The mass storage 104 is an example of a tangible storage medium readable by the processors 101, where the software 120 is stored as instructions for execution by the processors 101 to implement a circuit and/or to perform a method. Network/communications adapter 106 interconnects system bus 113 with an outside network 116 enabling processing system 100 to communicate with other such systems. A screen (e.g., a display monitor) 115 is connected to system bus 113 by display adapter 112, which may include a graphics controller to improve the performance of graphics intensive applications and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 140, and speaker 111 can be interconnected to system bus 113 via user interface adapter 108, which may include, for example, a Super I/O chip integrating multiple device adapters into a single integrated circuit.

Thus, as configured in FIG. 1, processing system 100 includes processing capability in the form of processors 101, and, storage capability including system memory 114 and mass storage 104, input means such as a keyboard 109, mouse 140, or touch sensor 115 (including touch sensors 109 incorporated into displays 115), and output capability including speaker 111 and display 115. In one embodiment, a portion of system memory 114 and mass storage 104 collectively store an operating system to coordinate the functions of the various components shown in FIG. 1.

In some embodiments, one or more methods are embodied in a set of instructions for one or more processors having access to one or more types of memory. The instructions could be coded in hardware or in software. Many kinds of platforms may be used, including, but not limited to: computers, mobile devices, tablets, game consoles, network management devices, field-programmable gate arrays, and cloud-based computer systems. Aspects of the disclosure could be deployed on multiple devices for concurrent operation. Embodiments may be used as a component of a larger system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or embodiments combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including, but not limited to wireless, wireline, optical fiber cable, RF, etc., or any suitable combination of the foregoing.

Computer program code for carrying out operations for aspects of the present invention may be written in any combination of one or more programming languages. As defined herein, computer program code also includes the build artifact of any of the above languages, or similar languages and environments, such as object code, byte- or word-code, or other compiled, interpreted, or processed code. The program code may execute entirely on the user's computer, partly on the user's computer, as a stand-alone software package, partly on the user's computer and partly on a remote computer or entirely on one or more remote computers, servers, or serverless cloud platforms. In the latter scenario, the remote computer may be connected to the user's computer through any type of network, including a local area network (LAN) or a wide area network (WAN), or the connection may be made to an external computer.

Aspects of embodiments of the present invention that are described above with reference to flowchart illustrations and/or block diagrams of methods, apparatus (systems) and computer program products according to embodiments of the invention. The flowchart and/or block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatuses, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described herein were chosen and described in order to best explain the principles of the invention and the practical application, and to enable others of ordinary skill in the art to understand the invention for various embodiments with various modifications as are suited to the particular use contemplated.

Technical effects and benefits include improved methods for compliance with regulatory mandates and contractual obligations, improved reserves estimated, improved forecasting and economic evaluation, improved waterflood conformance, improved water shutoff and re-entry, improved oilfield optimization, and improved planning for infill drilling.

Embodiments of the disclosed technology can combine data assimilation, optimization and machine learning algorithms with simplified physics of fluid flow in porous media. In a first step, the time varying allocation factors for each injection well in each layer of the reservoir can be determined by using a total liquid material balance. This step can include production logging tool data to improve the allocations per layers. In a second step, the primary cut of injected fluid, the pore volume and relative permeability functions in the Buckley-Leverett model for each injector-producer pair can be tuned to match the oil and water production for each producer given the allocation factors from the previous step. The second step provides the oil and water production rates from each layer for each production well, that can be used to make development decisions.

Figure 2:
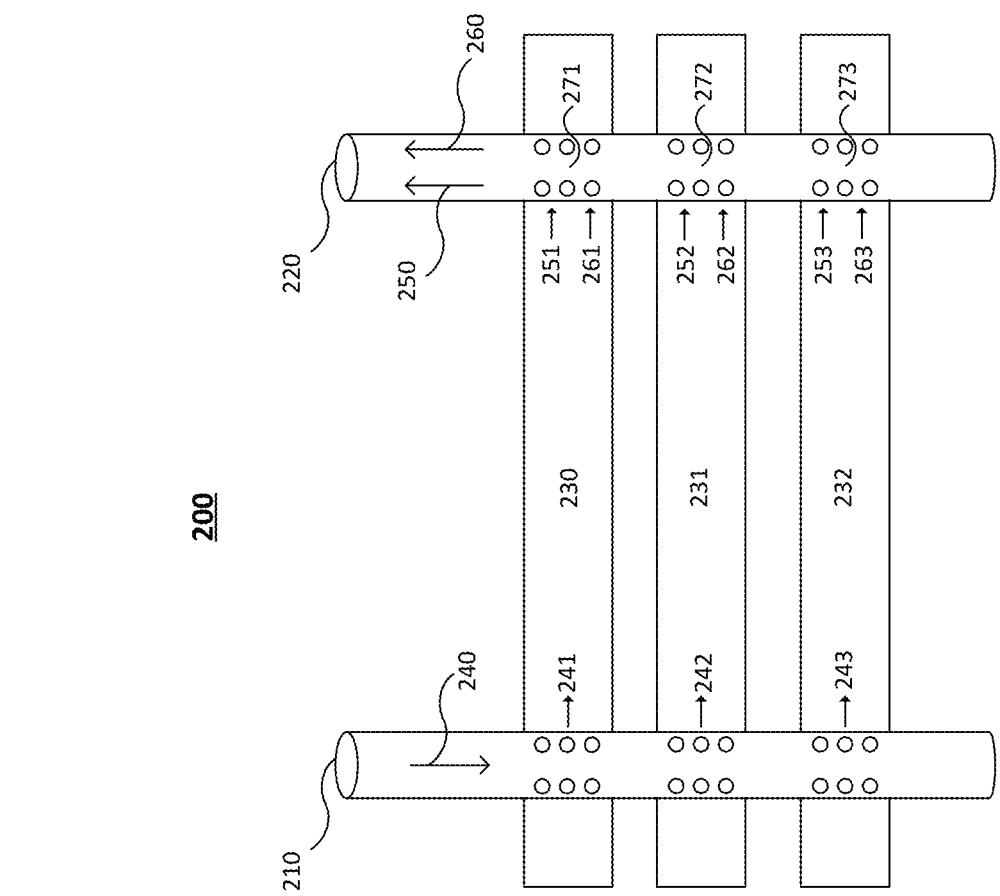
FIG. 2 depicts a model of a single production—injection well pair connected by three separate reservoir layers.

FIG. 2 is a simplified diagram of an oilfield performing waterflood oil recovery 200. Waterflooding is a process used to inject water into an oil-bearing reservoir for pressure maintenance as well as for displacing and producing incremental oil after (or sometimes before) the economic production limit has been reached. This can be done through the displacement of oil and free gas by water. In waterflooding, water is injected into one or more injection wells while the oil is produced from surrounding producing wells spaced according to the desired patterns. Such an oilfield includes one or more injection wells 210 that inject water into a plurality of oil-bearing geological layers 230-32. The injection well 210 injects water 240 into the plurality of geological layers at locations 2A41-43. The production well 220 recovers a fluid comprising water 250 and oil 260, which is the combination of water 251-53 and oil 261-63 recovered at plurality of perforations 271-73 in the geological layers 230-32.

Figure 3:
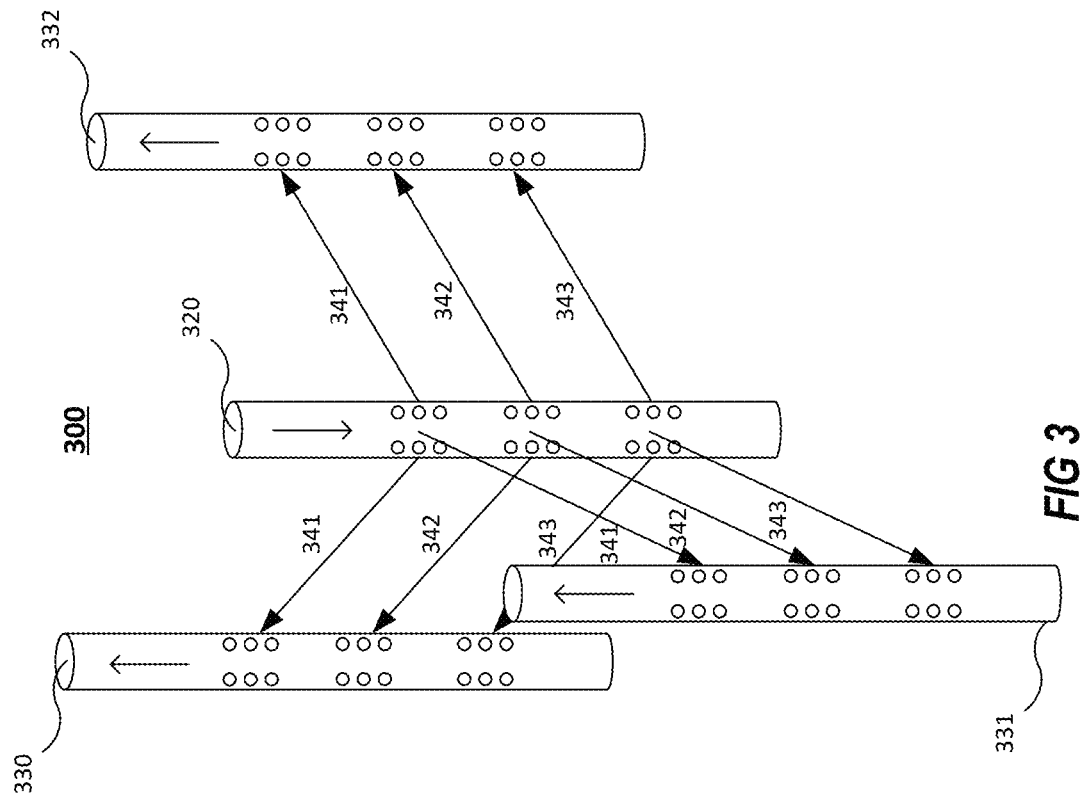
FIG. 3 depicts a model of a single injection well connected by reservoir layers to three separate production wells.
Figure 4:
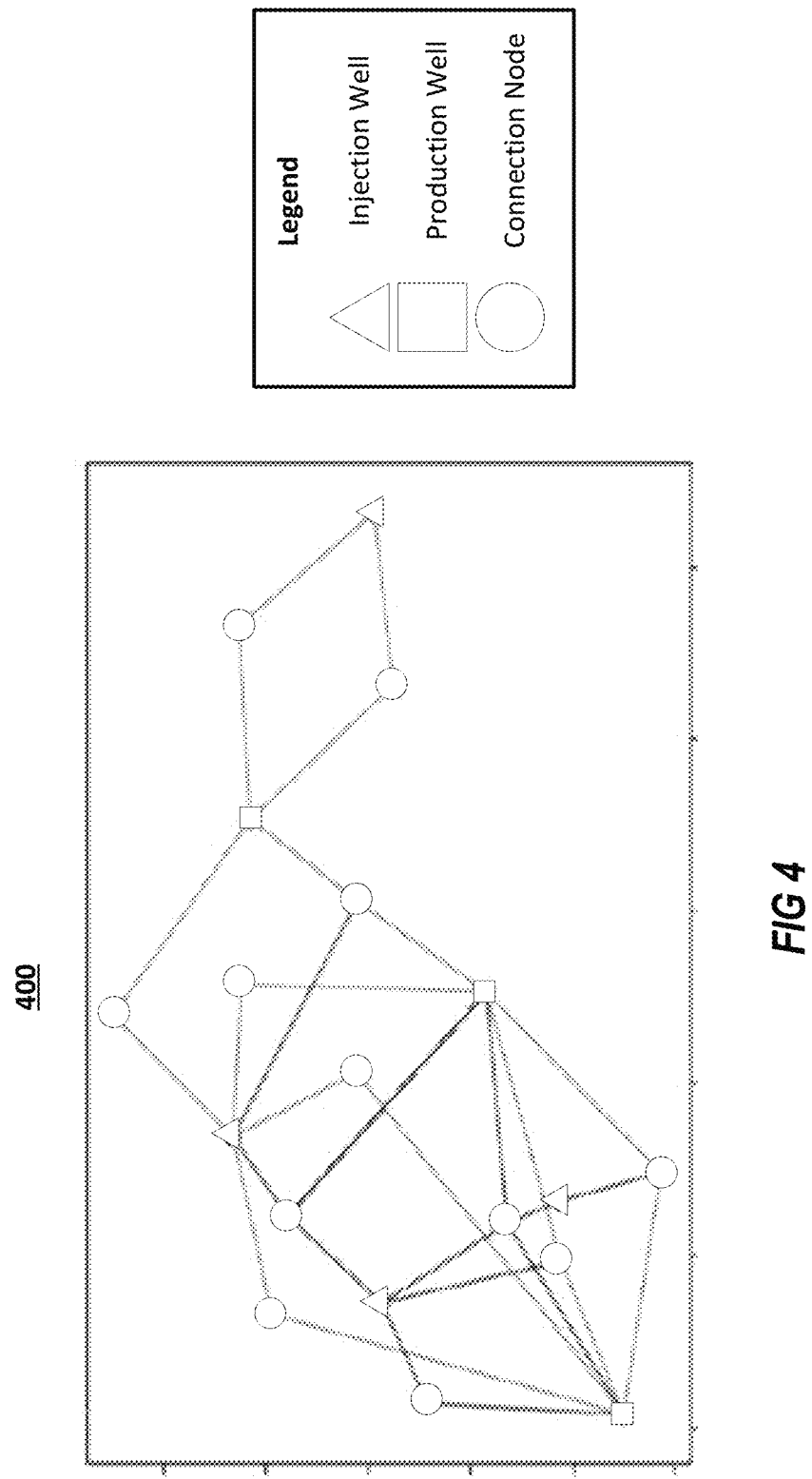
FIG. 4 depicts an example reservoir layer connected to a plurality of injection and production wells.

FIG. 3 is a diagram of an oilfield performing oil recovery 300 where a single injector 320 is connected to a plurality of geological layers 341-43 and to a plurality of production wells 330-32. As illustrated here, a single injection well 320 can be connected to a plurality of producer wells 330-32 via a plurality of layers 341-43. As would be understood by a person of ordinary skill in the art, other varieties of connection are possible in accordance with embodiments, including where a production well is connected to a plurality of injection wells via a plurality of layers. Likewise, not every injection or production well need be connected to each layer. FIG. 4 shows an example connection diagram for a single geological layer of an oilfield having a plurality of injection wells and production wells. As would be recognized by a person of ordinary skill in the art, such diagrams may differ between layers even among the same set of injection and production wells, which can vary because of geological features, production strategy, or other reasons.

Figure 6:
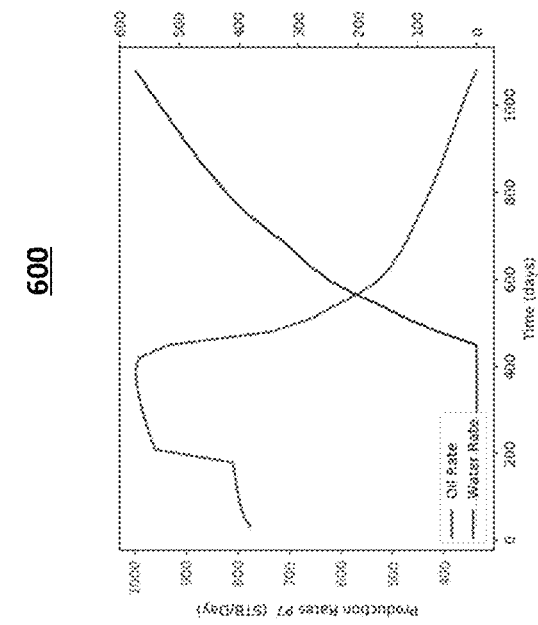
FIG. 6 is a graph showing fluid production at a production well, with separate lines showing oil and water production from the well.
Figure 5:
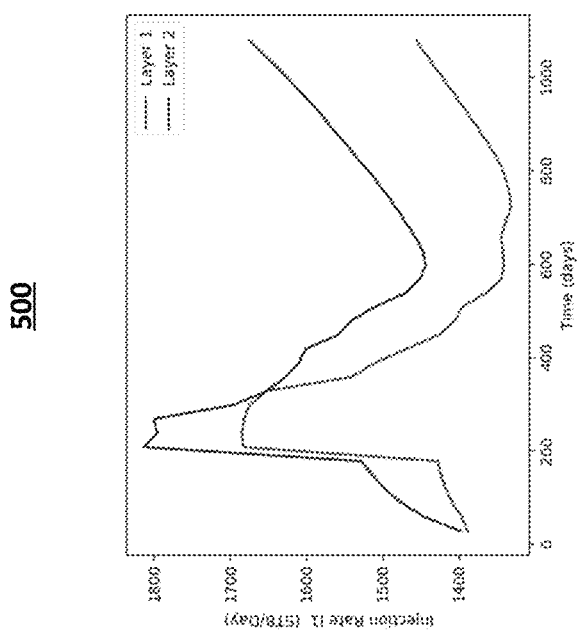
FIG. 5 is a graph showing well injection rates over time from an injection well into two reservoir layers.

FIGS. 5 and 6 depict input information in accordance with embodiments. FIG. 5 illustrates time-series injection data for use in embodiments for a single injection well. As illustrated, for injection wells, it is common to measure injection at the layer level. FIG. 5 shows this by illustrating injection rates at Layer 1 and Layer 2. FIG. 6 illustrates time-series production data from a single production well for use in embodiments. FIG. 6 shows production rates of both oil and water produced at the wellhead for a production well. The data depicted in FIGS. 5 and 6 are relatively easy to measure directly.

For the purposes of this disclosure, an oilfield is assumed to have N injection wells and M producer wells which are perforated in total of L layers. In some embodiments, injection rates at the layer level are known and we use $q_{n,l,j}^I$ to denote the injection rate of well n in layer l at time j, as depicted in FIG. 5. In some embodiments the oil and water production rates at well level at each time are also known, as depicted in FIG. 6. In this disclosure, $q_{m,j}^p$ is used to denote the production rate of well m at time j where p can be w, o, or t for water rate, oil rate and total rate, respectively.

Some embodiments of the disclosed technology begin with a gross match, or gross mass balance step. This is performed by solving for time-varying injection allocation factors for each producer-injector connection (path) using a total material balance equation across all wells together. The injection allocation factor will vary with time as injection and production rates change and existing wells are shut off or new wells are drilled. Accordingly, in some embodiments, the material balance can be solved continuously.

The estimated total liquid production of well m from layer l at time j can be written as a linear combination of injector rates of connected injectors in that layer:

$$q_{m,l,j}^t = \sum_{i \in \Phi_{m,l}} q_{i,l,m,j} \qquad (1)$$

where $\phi_{m,l}$ is the list of all injectors connected to producer m at layer l. It follows that the total production from all layers of producer m is given by $$q_{m,j}^t = \sum_{l \in \Gamma_m} q_{m,l,j}^t + s_{m,j} \quad (2)$$

where $\Gamma_m$ is the list of all layers contributing to producer m. Note that $q_{m,j}^t$ is known for any producer at any time. Similarly, we can write the estimated injection rate of well n at layer l at time j as:

$$q_{n,l,j}^I = \sum_{i \in \Omega_{n,l}} q_{n,l,i,j} + s_{n,l,j} \quad (3)$$

where $\Omega_{n,l}$ is the list of all producers connected to injector n at layer l. The variables $s_{m,j}$ and $s_{n,l,j}$ are called the slack variables and are used to account for inconsistent mass balance between injection and production due to loss of injection or external source. Note that we have two options for slack variables: (1) slack is assigned to injectors only and (2) slack is assigned to produces and injectors. In the first option, a slack is assigned to each injector at the layer level and $s_{m,j}$ is zero for all producers. In this case, slack variable $s_{n,l,j}$ can be positive or negative; a positive slack variable indicates a loss of injection and a negative slack variable shows an external source is contributing to production. In the second option, we have a slack variable for each producer at the well level as well as the layer level injector slack variable, and both slack variables must be non-negative (they can be zero or positive). In this case, the water cut of the producers' slack is tuned in the phase match step of the algorithm. In example embodiments, $q_{n,l,j}^I$ is known for any injector at layer level at any time.

In this formulation we assume that the connection lists $\phi_{m,l}$ and $\Omega_{n,l}$ are known, however, we have the option to generate these lists based on distance. In such case, at each layer, a pair of injection and production wells are assumed connected if their spatial distance is less than a specified maximum distance and if both are open in the given layer. In this case, the user can provide fault blocks to limit the connections to those in which the connected injector and producer wells pertain to the same fault block.

A mass balance or gross match is achieved by finding a set of $q_{n,l,i,j}$, $s_{m,j}$ and $s_{n,l,j}$ such that equations (2) and (3) are satisfied. In some embodiments, this optimization problem is solved by looking for the smoothest timeseries for $q_{n,l,i,j}$, $s_{m,j}$ and $s_{n,l,j}$ satisfying the mass balance equations given in (2) and (3). This optimization problem can be set up by minimizing the equation:

$$0 = \sum_{j=1}^{T-2} \sum_{l=1}^{L} \sum_{n=1}^{N} \sum_{i \in \Omega_{n,l}} \left[ \left( \frac{q_{n,l,i,j}}{Q_{n,l,j}} - 2\frac{q_{n,l,i,j-1}}{Q_{n,l,j-1}} + \frac{q_{n,l,i,j-2}}{Q_{n,l,j-2}} \right)^2 \right] + \quad (4)$$

$$\sum_{j=1}^{T} \sum_{m=1}^{M} \left( \frac{s_{m,j}}{\Delta Q_j} \right) + \sum_{j=1}^{T} \sum_{l=1}^{L} \sum_{n=1}^{N} \left( \frac{s_{n,l,j}}{\Delta Q_j} \right)^2$$

The first term can ensure that our solution is smooth in time by minimizing the second derivative of the rates with respect to time and the second and the third terms are to ensure that a solution with minimum slack variables is obtained. Note that we normalize the connection rates by $Q_{n,l,j}$ which is the rate of injector n at layer l and time j and the slack variables by $\Delta Q_j$ which is the total mass balance miss-match at time j. The optimization problem can then defined by minimizing $O(q_{n,l,i,j}, s_{n,l,j})$ such that equations (2) and (3) are satisfied. As a result of solving this optimization problem, the injection rates for any connection between an injector-producer pair can be obtained. Also note that we can perform this optimization sequentially in time, where we split the timeseries and find the optimal solution for each split such that the two adjacent solutions are continuous in time. This feature allows obtaining the solution faster for large problems.

Figures 7, 8:
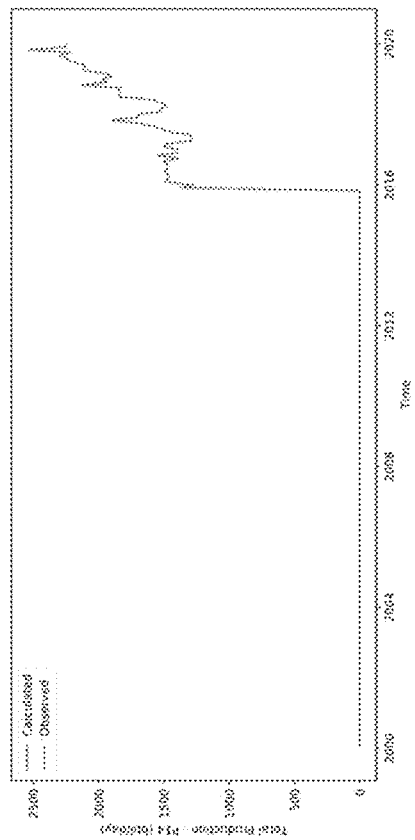
FIG. 7 is a graph of total fluid injection into a reservoir layer over time.
FIG. 8 is a graph of total fluid production from a reservoir over time.

FIGS. 7 and 8 illustrate the result of performing the gross match step for balancing total injected fluid and total production. As shown in these graphs, solving the optimization problem in some embodiments results in a calculation of total injection rates (FIG. 7) into each layer and total production rates at each well (FIG. 8) that nearly perfectly match observed total injection and production. While FIGS. 7 and 8 depict solutions for a discrete time interval, the injection allocations can continue to vary with time as injection and production rates change, and new wells are drilled or shut off. Accordingly, in some embodiments, this calculation can be solved continuously.

In some embodiments, this solution includes performing a phase match step. In this step parameters for the Buckley-Leverett model can be tuned for each injector-producer pair, including pore volume, relative permeability, the primary cut of injected fluid (for the case where producers also have slack variables) and others. This tuning can be performed across all connected layers to match the oil and water production for each producer. With these parameters, an estimate for the oil and water production rates from each layer and each production well can be determined.

This process begins by using the time-varying allocations for all active connections between the injectors and producers at the layer level as obtained in the gross match step. Using that as input, the total production rate from each layer can be determined. In some embodiments, this is performed by solving a Buckley-Leverett equation for each producer-injector connection to find the fraction of water at the producer ($f_w$). The oil and water production from all connections of each producer is summed to obtain the well level oil and water production rates. It follows that the oil and water production from all layers of producer m are given by $$q_{m,j}^w = \sum_{l \in \Gamma_m} \sum_{i \in \Phi_{m,l}} (f_w q)_{i,l,m,j} \quad (4)$$

$$q_{m,j}^o = \sum_{l \in \Gamma_m} \sum_{i \in \Phi_{m,l}} ((1 - f_w) q)_{i,l,m,j} \quad (5)$$

In the case where there is a slack variable for the producers, there will be an extra term added to (4) and (5) associated with the water and oil cuts pertaining to the slack.

In some embodiments, an ensemble-based method is used to tune the parameters of the Buckley-Leverett equation, such as relative permeability parameters (e.g., exponents, end points), initial saturation and pore volume for all connections of a producer match total water and oil production rates. In some embodiments, this process can be done for each producer individually, allowing parallelization of computerized solutions. A solution, or set of possible solutions, for the parameters can be obtained.

In some embodiments, Ensemble Smoother with Multiple Data Assimilation (ES-MDA) can be used to tune the Buckley-Leverett parameters, however, other optimization methods can be used in accordance with embodiments. The inventors have observed that ES-MDA is a particularly computationally efficient method, although other methods can provide adequate performance. Where a plurality of possible solutions is obtained, such plurality can further be analyzed to determine the relative uncertainty of those solutions. For example, for a single set of parameters, a particular volume of water and oil can be calculated to be produced out of a reservoir layer. By calculating the volumes of water and oil for a plurality of such solutions, various statistical parameters, such as mean values, standard deviations, and other statistical measures can be calculated to determine the relative uncertainty of such solutions.

Figure 10:
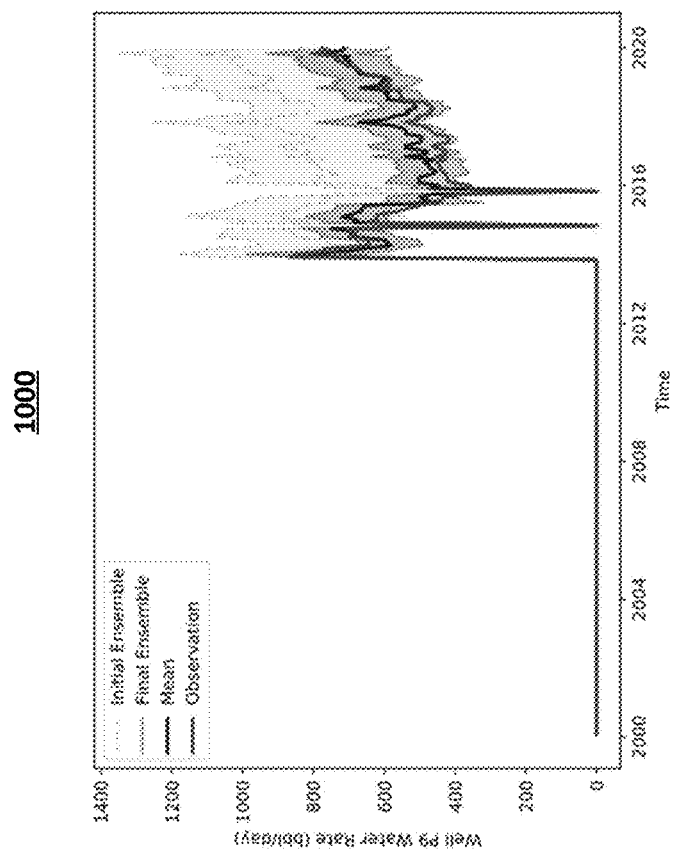
FIG. 10 is a graph showing total water production rates from a particular production well from a particular over time, in accordance with embodiments.
Figure 9:
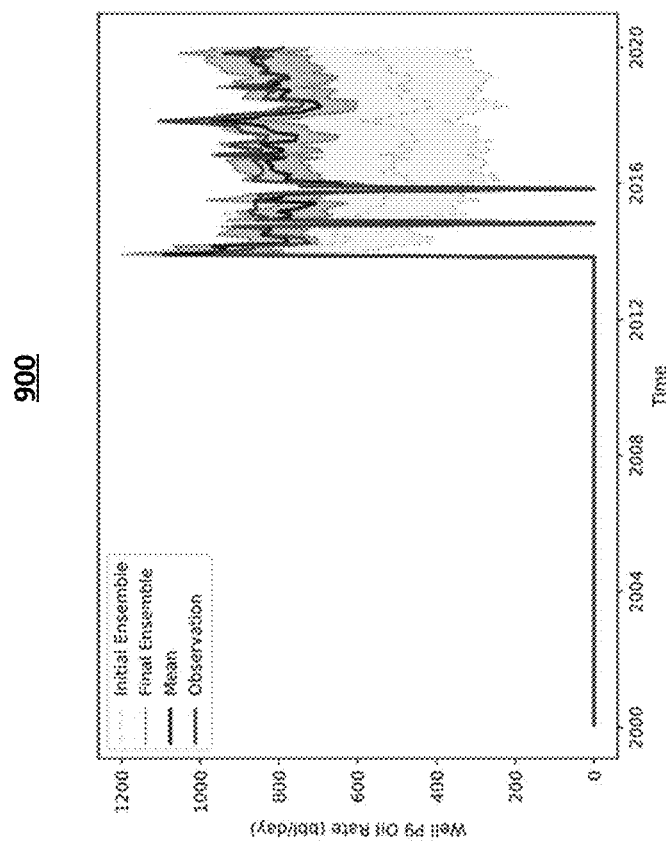
FIG. 9 is a graph showing total oil production rates from a particular production well from a particular over time, in accordance with embodiments.

FIGS. 9 and 10 depict the results of obtaining a plurality of possible solutions for the oil and water production rates at a single production well. While the solution of the phase match step is a set of oil and water production timeseries for each well and for each layer, the results can be validated by summing the production at all layers and comparing to the measured total oil and water production values directly measured. FIG. 9 depicts the oil produced at a certain well as directly observed (Observation), the sum of the plurality of possible solutions for each layer connected to the well (Final ensemble), and the mean of the plurality of possible solutions (Mean). As can be shown, the mean of the plurality of possible solutions very closely matches the observed oil produced at the well. Similarly, FIG. 10 depicts the water produced at the same well as directly observed (Observation), the sum of the plurality of possible solutions for each layer connected to the well (Final ensemble), and the mean of the plurality of possible solutions (Mean). Again, there is a very close match between the mean and observed values. This confirms that the phase match step can produce accurate predictions for production from each production well.

Figure 11:
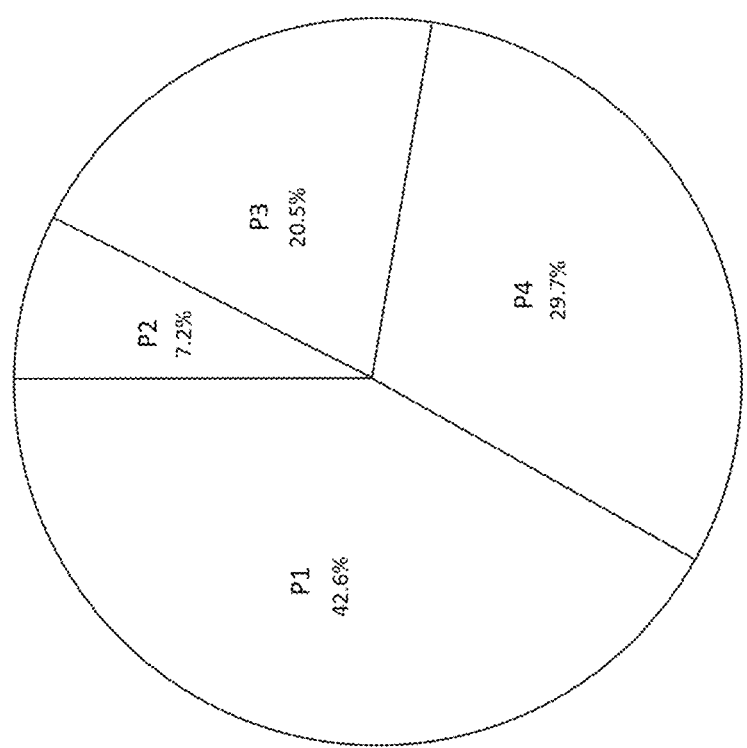
FIG. 11 is a graph showing an allocation of injected water from a plurality of injection wells and total fluid recovered at a production well in accordance with embodiments.
Figure 12:
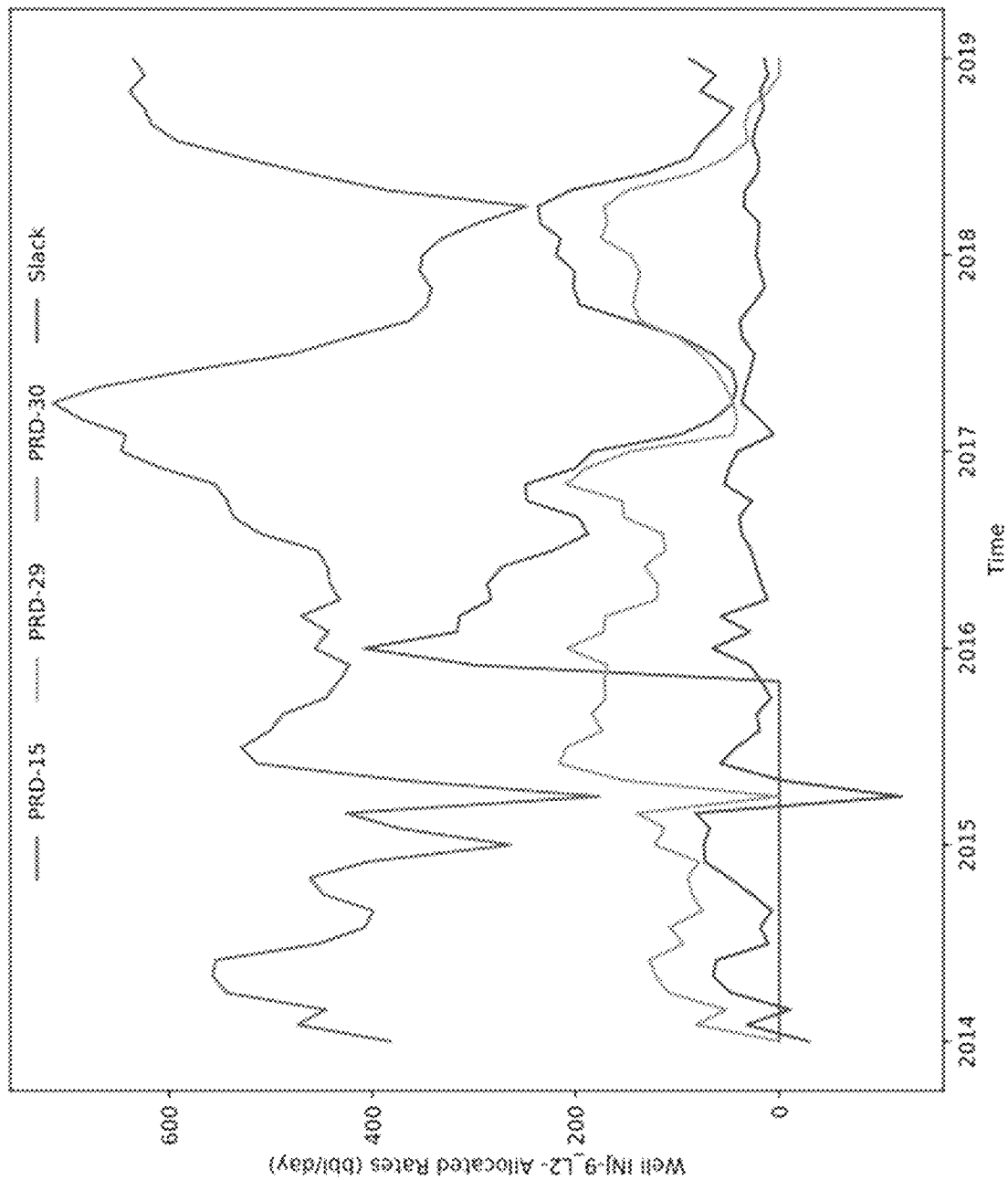
FIG. 12 is a graph showing injection allocations to a plurality of production wells over time in accordance with embodiments.
Figure 13A:
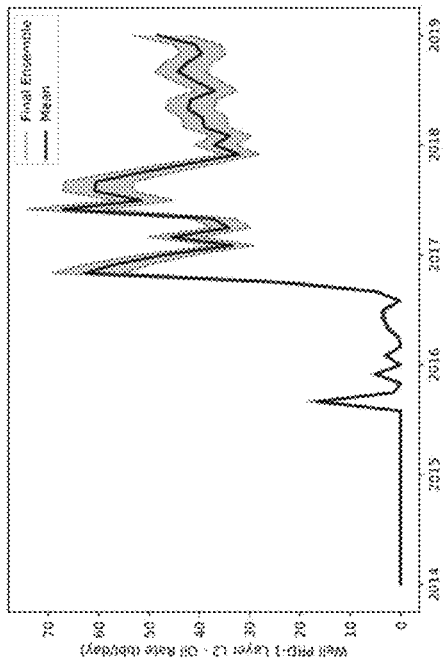
FIGS. 13A-13D are graphs showing the allocation of oil production as produced from a single production well to a plurality of reservoir layers in accordance with embodiments.
Figure 13B:
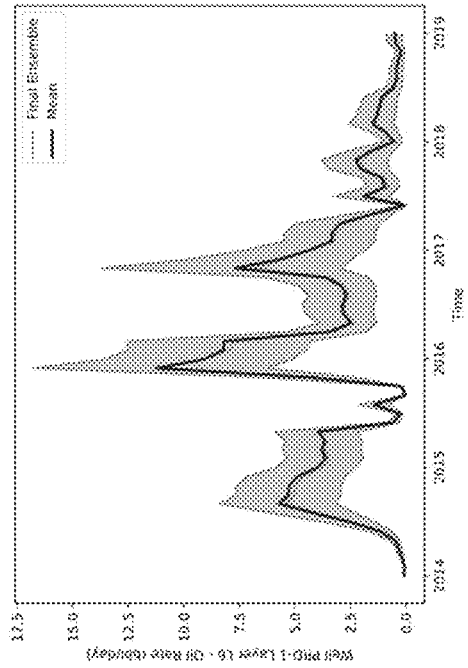
Figure 13C:
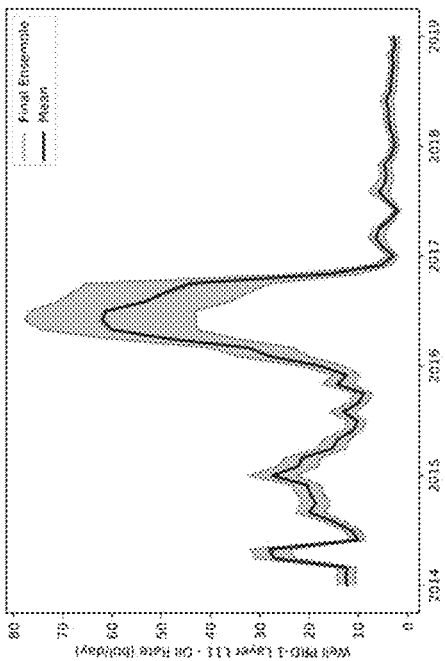
Figure 13D:
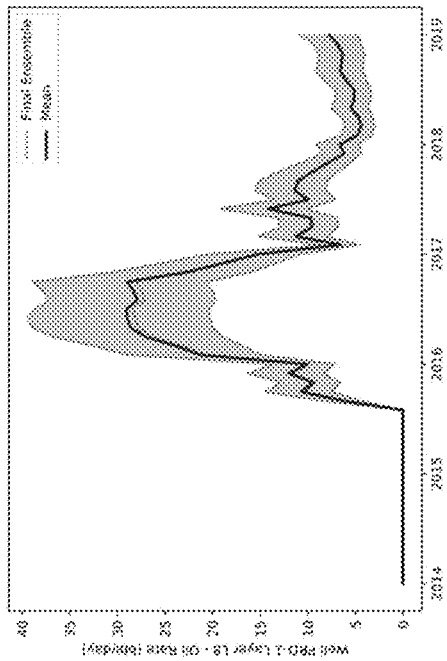

In some embodiments, one or both of the gross match and phase match steps can be executed for a plurality of connected patterns in an oil field, including all connected patterns or for the whole oil field. The result of the tool can include allocated injection and production for each layer. For example, by summing the water flow rates for each injector-producer pair that includes a specific injector well, an allocation of where the injected water is being distributed can be calculated. FIG. 11 depicts an injection allocation in accordance an embodiment. Here, we see allocation percentages from an injector well to each of four production wells (P1, P2, P3, P4), indicating that a majority of the injected water is being recovered by P1 and P4. Embodiments of the present disclosure also permit the determination of time-series allocations of injected water to projection wells. As previously discussed, the result of analyses performed in accordance with embodiments includes time-series allocations of injection to various wells. FIG. 12 depicts a time-series allocation of injected water form an injector at a specific layer to the connected producers and including the slack variable discussed above.

Another analysis possible in accordance with embodiments is allocation of oil and water produced at a production well from each layer. FIGS. 13A-13D depict allocations of oil to specific layers within an oil field. These figures can be formed by summing the oil produced from each production-injection connection within the layer. In doing so, various analyses of production from known reservoirs can be performed to facilitate well planning, regulatory, and other functions.

Figure 14A:
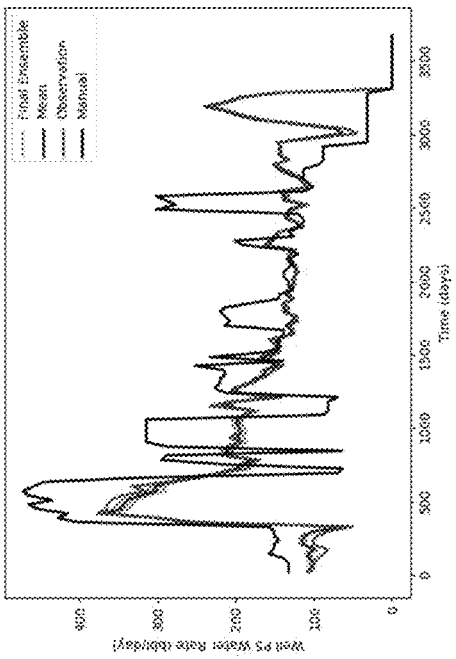
FIGS. 14A-14D are graphs showing total production of oil and water from various wells over time as predicted by embodiments as compared to a manual estimation process.
Figure 14B:
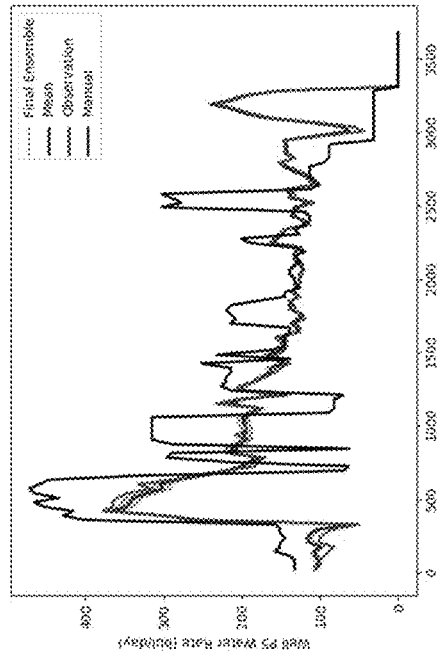
Figure 14C:
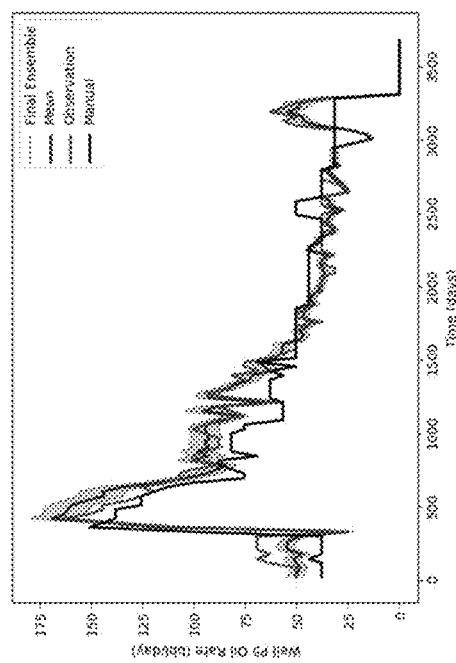
Figure 14D:
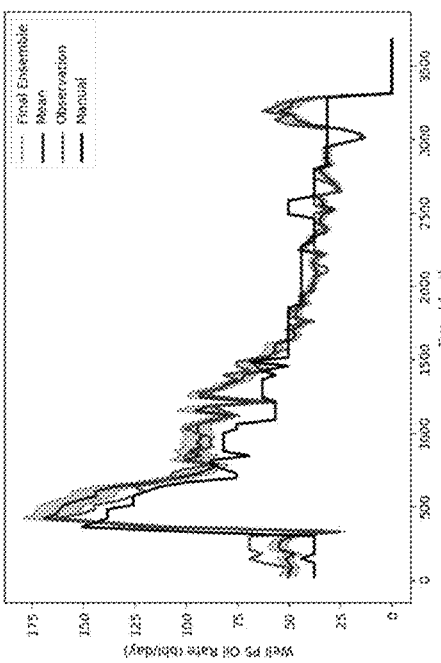

FIGS. 14A-14D illustrate an embodiment as compared to a manual technique, showing lines for each member of the model ensemble (Final ensemble), an ensemble mean (Mean), the actual observed oil production (Observation), and the equivalent allocation as produced by manual estimation (Manual). FIGS. 14A and 14C depict oil produced at a specific well over time, showing that the ensemble models and the mean thereof provide a superior prediction of actual oil production than the manual estimation method. FIGS. 14B and 14D likewise show water production rates at the same two wells, also demonstrating the superiority of embodiments of the disclosed technology over manual estimation.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A computer-implemented method for determining the production rate of oil produced from each of a plurality of wells in an oil field with a plurality of oil-bearing geological layers, the method comprising:
    allocating injected fluid into each layer of a plurality of oil-bearing geological layers to a plurality of paths from injection sites of injection wells to production wells in each layer by balancing the mass of fluid injected into and the total fluid recovered from each oil-bearing geological layer,
    calculating estimated geological properties for each path in the plurality of paths to match total oil and injection fluid recovered at each production well in the plurality of production wells, and
    using the estimated geological properties, calculating an oil production rate for each path between an injector well and a production well in a geological layer.

2. The method of claim 1 wherein the step of allocating injection fluid is performed by:
    determining an optimal set of allocations of injected fluid to the plurality of paths that balance the injected fluid into each layer, the total fluid produced at the plurality of production wells, and a plurality of slack variables representing a mass imbalance between the mass of fluid injected and the mass of fluid recovered from each geological layer, where the optimal set of allocations is constrained such that the layer allocation rates over time are smooth, and that the slack variables are minimized.

3. The method of claim 1, wherein the step of calculating estimated geological properties comprises estimating parameters of the Buckley-Leverett model for two-phase flow in porous media.

4. The method of claim 1, wherein the set of estimated geological properties comprises pore volume, relative permeability curves, and curves for a primary cut of injected fluid.

5. The method of claim 1, wherein the step of calculating the set of estimated geological properties comprises using an ensemble of models fit to the allocations of injected fluid into each layer with the total oil and water produced at each production well.

6. The method of claim 5, wherein each model produces an individual estimate of the geological properties, and wherein the estimated geological properties are calculated by characterizing a distribution formed from the individual estimates of the ensemble of models.

7. The method of claim 1, wherein the plurality of paths from injection sites of injection wells to production wells in each layer is calculated from a map of injection well sites and production well sites based on the distances between the injection well sites and production well sites.

8. A computing system for determining the production rate of oil produced from each of a plurality of oil-bearing geological layers in an oil field, the system comprising:
one or more memories having computer readable computer instructions; and
one or more processors for executing the computer readable computer instructions to perform a method comprising:
allocating injected fluid into each layer of a plurality of oil-bearing geological layers to a plurality of paths from injection sites of injection wells to production wells in each layer by balancing the mass of fluid injected into and the total fluid recovered from each oil-bearing geological layer,
calculating estimated geological properties for each path in the plurality of paths to match total oil and injection fluid recovered at each production well in the plurality of production wells, and
using the estimated geological properties, calculating an oil production rate for each path between an injector well and a production well in a geological layer.

9. The system of claim 8 wherein the step of allocating injection fluid is performed by:
determining an optimal set of allocations of injected fluid to the plurality of paths that balance the injected fluid into each layer, the total fluid produced at the plurality of production wells, and a plurality of slack variables where the optimal set of allocations is constrained such that the layer allocation rates over time are smooth, and that the slack variables are minimized.

10. The system of claim 8, wherein the step of calculating estimated geological properties comprises estimating parameters of the Buckley-Leverett model for two-phase flow in porous media.

11. The system of claim 8, wherein the set of estimated geological properties comprises pore volume, relative permeability curves, and curves for a primary cut of injected fluid.

12. The system of claim 8, wherein the step of calculating the set of estimated geological properties comprises using an ensemble of models fit to the allocations of injected fluid into each layer with the total oil and water produced at each production well.

13. The system of claim 12, wherein each model produces an individual estimate of the geological properties, and wherein the estimated geological properties are calculated by characterizing a distribution formed from the individual estimates of the ensemble of models.

14. The system of claim 8, wherein the plurality of paths from injection sites of injection wells to production wells in each layer is calculated from a map of injection well sites and production well sites based on the distances between the injection well sites and production well sites.

15. One or more non-transitory computer-readable storage media containing machine-readable computer instructions that, when executed by a computing system, performs a method for determining the production rate of oil produced from each of a plurality of oil-bearing geological layers in an oil field, the method comprising:
allocating injected fluid into each layer of a plurality of oil-bearing geological layers to a plurality of paths from injection sites of injection wells to production wells in each layer by balancing the mass of fluid injected into and the total fluid recovered from each oil-bearing geological layer,
calculating estimated geological properties for each path in the plurality of paths to match total oil and injection fluid recovered at each production well in the plurality of production wells, and
using the estimated geological properties, calculating an oil production rate for each path between an injector well and a production well in a geological layer.

16. The one or more non-transitory computer-readable storage media of claim 15 wherein the step of allocating injection fluid is performed by:
determining an optimal set of allocations of injected fluid to the plurality of paths that balance the injected fluid into each layer, the total fluid produced at the plurality of production wells, and a plurality of slack variables representing a mass imbalance between the mass of fluid injected and the mass of fluid recovered from each geological layer, where the optimal set of allocations is constrained such that the layer allocation rates over time are smooth, and that the slack variables are minimized.

17. The one or more non-transitory computer-readable storage media of claim 15, wherein the step of calculating estimated geological properties comprises estimating parameters of the Buckley-Leverett model for two-phase flow in porous media.

18. The one or more non-transitory computer-readable storage media of claim 15, wherein the set of estimated geological properties comprises pore volume, relative permeability curves, and curves for a primary cut of injected fluid.

19. The one or more non-transitory computer-readable storage media of claim 15, wherein the step of calculating the set of estimated geological properties comprises using an ensemble of models fit to the allocations of injected fluid into each layer with the total oil and water produced at each production well.

20. The one or more non-transitory computer-readable storage media of claim 19, wherein each model produces an individual estimate of the geological properties, and wherein the estimated geological properties are calculated by characterizing a distribution formed from the individual estimates of the ensemble of models.

21. The one or more non-transitory computer-readable storage media of claim 15, wherein the plurality of paths from injection sites of injection wells to production wells in each layer is calculated from a map of injection well sites and production well sites based on the distances between the injection well sites and production well sites.

* * * * *